United States Patent [19]

Brown

[11] 4,368,897
[45] Jan. 18, 1983

[54] BICYCLE FRAME STRUCTURE

[76] Inventor: Charles B. Brown, 1115 5th St., Santa Monica, Calif. 90403

[21] Appl. No.: 223,907

[22] Filed: Jan. 9, 1981

[51] Int. Cl.³ .......................... B62J 7/02; B62K 3/02
[52] U.S. Cl. ................................ 280/202; 224/32 R; 280/281 B; 280/289 A
[58] Field of Search ............... 280/202, 281 R, 281 B, 280/289 A, 289 R; 224/30 R, 31, 32 R, 35

[56] References Cited

U.S. PATENT DOCUMENTS

| | | | |
|---|---|---|---|
| 567,162 | 9/1886 | Peirce | 280/202 |
| 592,886 | 11/1897 | Sanders | 280/202 |
| 657,382 | 9/1900 | Bartlett | 280/202 |
| 2,011,016 | 8/1935 | Schwinn | 280/202 |
| 2,051,823 | 8/1936 | Clarke | 280/202 |
| 2,080,677 | 5/1937 | Uber | 280/202 |
| 2,182,828 | 12/1939 | Stutsman et al. | 280/281R |
| 2,354,125 | 7/1944 | Johnson | 280/281 |
| 2,537,325 | 1/1951 | Bowden | 280/281 R |
| 2,827,301 | 3/1958 | Stevens | 280/281 R |
| 3,233,916 | 2/1966 | Bowden | 280/281 R |
| 3,375,024 | 3/1968 | Bowden | 280/281 R |
| 3,741,429 | 6/1973 | Purcell et al. | 280/281 R |

FOREIGN PATENT DOCUMENTS 14324 of 1896 United Kingdom ............. 224/32 R

Primary Examiner—Joseph F. Peters, Jr.
Assistant Examiner—Donn McGiehan
Attorney, Agent, or Firm—Fulwider, Patton, Rieber, Lee & Utecht

[57] ABSTRACT

An improved bicycle support frame structure for use in bicycles wherein the support frame structure comprises U-shaped channel members serving as load bearing elements and also cooperating with side panels to form a storage compartment for carrying baggage. The storage compartment is accessible through suitable access openings in the side panels, and the space within the compartment may be subdivided by internal brace members which also support and stiffen the side panels.

18 Claims, 8 Drawing Figures

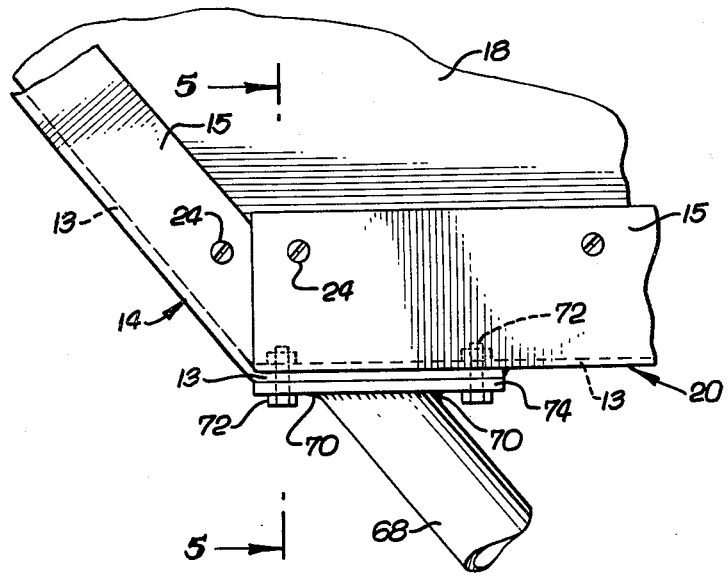
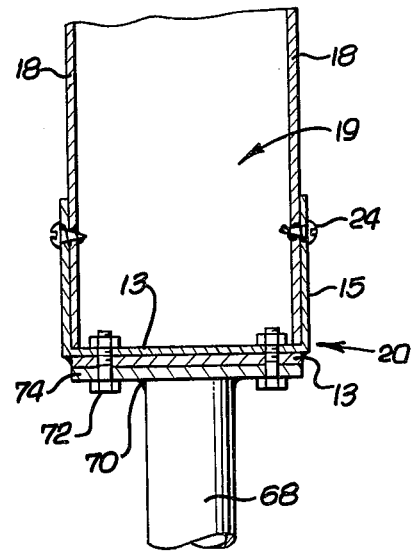
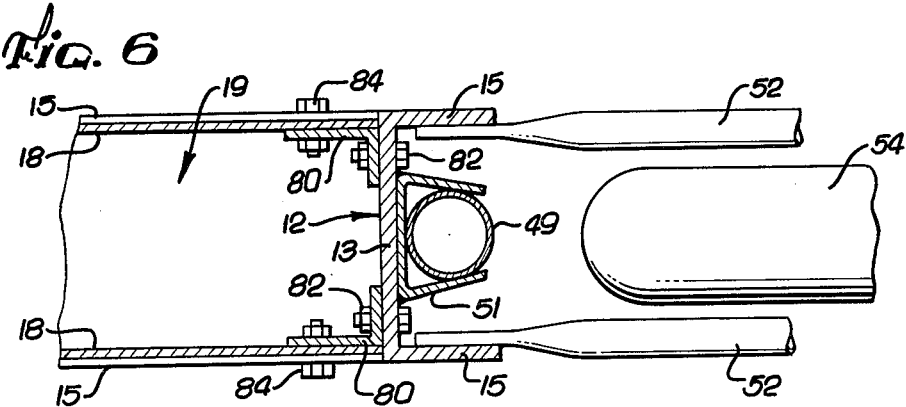
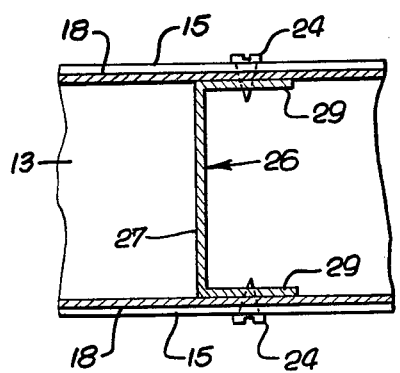

BICYCLE FRAME STRUCTURE

BACKGROUND OF THE INVENTION

This invention relates generally to bicycles and, more particularly, to a bicycle support frame structure in which the load bearing elements of the structure act also as wall members and cooperate with side panels to form a storage compartment within the spatial limits imposed by an otherwise conventionally configured bicycle frame.

Bicycling enjoys widespread popularity both as a means of recreation and as basic transportation for short distances. In the most widely used form, a general purpose bicycle consists of a frame, saddle, steering mechanism, two wheels and foot-propelled chain drive connected to the rear wheel. In operation, the rider of the bicycle sits on the saddle in a leaning-forward position, using both legs to provide propulsion and both hands to steer the bicycle and support himself. Thus, both the arms and legs of the rider are occupied during riding.

The frame of the bicycle is the central structural component, and is ordinarily composed of relatively lightweight and rigid tubular members interconnected essentially in triangular array, with front and rear members extending angularly upwardly from a pedal crank housing for respective connection to the steering mechanism and the saddle, and a cross brace connected between the front and rear members near their upper ends. Long experience has demonstrated that this generally triangular configuration gives greatest rigidity and strength for the lowest weight of component materials. Such weight efficiency is important, since even modest increases in weight greatly increase the effort which the rider must expend to propel the bicycle. Modifications of the generally triangular frame of tubular members do exist, but this basic design configuration has been proved most successful for general use and racing.

A problem of general, widespread concern to bicycle riders is the carrying of tools, spare parts, packages, refreshments, or other baggage. Many solutions to this problem have been proposed and implemented; any such solution must allow the carrying of a reasonable amount of baggage, while not compromising weight, interfering with the fundamental movements of the rider, and impairing the aesthetic appeal of bicycling. Additionally, it is desirable in many cases that carried baggage be secure as to both accidental loss and theft.

One class of solutions to the general problem of carrying baggage is to modify some aspect of the basic frame of the bicycle. Luggage racks supported over the rear or front wheel have proven to be the most popular of such modifications. Baggage pods that are attachable to the bicycle frame at a location between the wheels have also been utilized. Each of these approaches has drawbacks, as racks carry the baggage in an exposed condition where there is substantial risk of accidental loss, and baggage pods are typically heavy and/or bulky and can usually be easily demounted and stolen. Thus, prior solutions involving modifications to the basic bicycle frame have not been entirely satisfactory, in that aesthetics were impaired, operation hampered, weight added, or security of the baggage compromised.

Accordingly, there has been a need for a means for carrying tools, spare parts, packages, refreshments, spare clothing or other baggage that is secure from accidental loss or theft, does not interfere with operation of the bicycle, does not unduly increase the weight of the bicycle, and is aesthetically acceptable to bicycle users. The present invention fulfills this need.

SUMMARY OF THE INVENTION

The present invention resides in a modified bicycle support frame structure, wherein the support frame structure comprises a plurality of structural members serving the dual function of load bearing elements and wall members defining a portion of a storage compartment, thus reducing the additional weight necessary for achieving a desired amount of enclosed space. Side panels are provided in cooperation with the structural members to enclose a substantial portion of the spatial volume between front and rear wheels of the bicycle to provide a secure storage compartment at minimum increase to the overall weight of the bicycle.

More specifically, the invention comprises a bicycle support frame structure having one or more generally U-shaped channel members comprising load bearing elements as part of the overall bicycle frame and connected to each other to enclose the top, bottom, front, and rear of the storage compartment. The channel members provide structural rigidity and strength to the overall bicycle frame with a minimum weight and bulk, and also provide side flanges to which the side panels are attached to complete enclosure of the storage compartment. One or more access openings are formed in the side panels to allow access to the compartment, and such access openings can be closed by a hinged door or the like.

In a presently preferred embodiment the channel members and the side panels comprise a substantial portion of the overall bicycle frame between the front and rear wheels of the bicycle. However, a relatively small portion of the overall frame is advantageously formed from conventional tubular members. For example, a conventional pedal crank housing is carried by conventional tubular members near the ground between the front and rear wheels of the bicycle, and these tubular members extend upwardly for connection to the channel members at a point a short distance above the pedal crank housing. Thus, a standard pedal crank and bearing assembly can be used, and the compartment-forming members do not interfere with pedalling of the bicycle in a conventional manner.

Those skilled in the art will recognize that one or more of the U-shaped channel members may be incorporated as a part of the overall bicycle frame to obtain other storage compartments of other sizes and shapes. Through selective use of attachments including side panels for connection to the U-shaped members, great flexibility is obtained in tailoring the size and shape of the storage compartment to the needs of a particular bicycle.

It will be appreciated from the foregoing that the present invention represents an advance in the bicycle field. With this modified bicycle support frame structure, a relatively large storage compartment may be provided as a part of the overall bicycle frame with little or no increase in weight of the bicycle. Normal operations of the bicycle and its rider are not impaired in this construction. Additionally, the invention utilizes low-cost channel members in selected areas, with standard components such as tubular members in all other areas, thereby keeping the total bicycle cost low. Construction of the bicycle support frame structure in accordance with this invention additionally does not interfere with the utilization of other modifications, improvements, and convenience features such as headlights, carrying racks, detachable wheels, modified saddles, and radios.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 4 is an enlarged fragmented elevational view of area 4 in FIG. 1;

FIG. 5 is a fragmented sectional view taken generally along the line 5—5 of FIG. 4, illustrating connection of the lower portion of the support frame structure with respect to tubular members of the bicycle frame;

FIG. 6 is an enlarged fragmented sectional view taken generally along the line 6—6 of FIG. 1, illustrating connection of a rear portion of the support frame structure to a rear tubular member of the bicycle frame;

FIG. 7 is an enlarged fragmented sectional view taken generally along the line 7—7 of FIG. 1, illustrating an internal brace member within the storage compartment.

DETAILED DESCRIPTION OF THE PREFERRED EMBODIMENT

Figure 1:
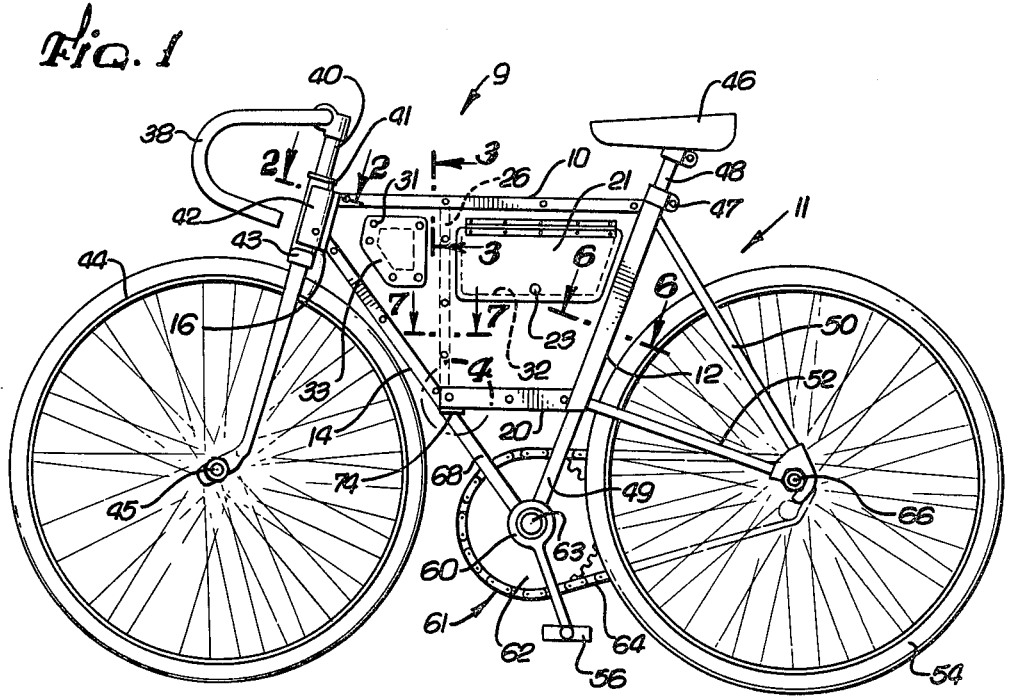
FIG. 1 is an elevational view of a bicycle embodying the support frame structure of this invention.

As is shown in the drawings for purposes of illustration, the present invention is concerned with a support frame structure 9 provided as a portion of a bicycle frame 11. The support frame structure 9 is defined by one or more structural members forming load bearing elements of the frame 11 and wall members forming a portion of an enclosure for a storage compartment 19. Additional wall members cooperate with these structural members to complete enclosure of the storage compartment.

In accordance with the present invention, a substantial portion of the bicycle frame 11 is constructed from one or more load bearing members to which are attached side panels to define the storage compartment 19. These channel members are adapted for connection to remaining components of the bicycle frame 11 for mounting the support frame structure 9 centrally with respect to the frame 11. The support frame structure 9 has a relatively narrow profile and is formed from lightweight and inexpensive components to provide the storage compartment 19 with little or no increase in the weight or bulk of the bicycle. Access to the storage compartment 19 is suitably provided through an access opening 32 in the side panels, as will be described in more detail.

The bicycle support frame structure 9 of this invention provides an improvement over traditional bicycle frame constructions formed primarily from an open network of interconnected tubular members. More specifically, the support frame structure 9 of this invention advantageously makes use of a substantial portion of the spatial volume between the front and rear wheels of the bicycle to form the storage compartment 19 for receiving baggage and the like without interfering with normal operation of the bicycle. The storage compartment is defined at least in part by load bearing elements forming an integral part of the overall bicycle frame 11, wherein the load bearing elements are formed from inexpensive and lightweight materials. The load bearing elements cooperate with the side panels which are also formed from lighweight and inexpensive materials to provide an improved bicycle frame 11 of increased utility by virtue of inclusion of the storage compartment 19, with little or no increase in the size or weight of the bicycle.

In a bicycle constructed in accordance with the invention, parts other than the support frame structure 9 are constructed in accordance with conventional, well-proven design. As illustrated in FIG. 1, the front end of the bicycle includes a steering mechanism in the form of conventional handle bars 38 joined to a generally vertically disposed steering post 40. The steering post 40 is supported for rotation about its own axis within a cylindrical steering post bearing 41 and extends downwardly through the bearing 41 with its lower end joined to a front fork 43 at a location below the steering post bearing 41. A front wheel 44 is retained for rotation about an axle 45 carried by the front fork 43 by suitable means such as retaining bolts or quick-release hubs.

The rear end of the bicycle includes a rear wheel 54 of conventional design rotatable about an axle 66 of a rear sprocket. The axle 66 and the rear sprocket are carried by means of retaining bolts or quick-release hubs within the connected lower ends of an opposed pair of upper and lower tubular struts 50 and 52 defining a rear fork. As illustrated in FIG. 1, these tubular struts 50 and 52 extend from the axle 66 angularly forwardly and upwardly for connection to the support frame structure 9 of this invention, as will be described.

The bicycle frame 11 further includes a drive assembly 61 of conventional construction including a cylindrical pedal crank bearing housing 60 disposed centrally and near the ground between the front and rear wheels 44 and 54. This pedal crank bearing housing 60 includes a drive shaft 63 rotatably driven in a known manner by pedals 56 and pedal cranks 58 to drive a relatively large front sprocket 62. The front sprocket 62 carries a flexible chain 64 which is also coupled to the rear sprocket for transmission of the pedalling force to the rear wheel 54.

A rear tubular member 49 has its lower end secured, as by welding, to the pedal crank bearing housing 60, and extends therefrom upwardly and slightly rearwardly for axial reception of a saddle post 48 carrying a saddle 46 for the bicycle. The saddle 46, of course, supports the rider during operation of the bicycle, with a saddle clamp 47 being provided to allow for convenient height adjustment of the saddle post 48 within the rear tubular member 49 to accommodate the position of the saddle 46 to the particular rider.

In accordance with the invention, the support frame structure 9 of this invention is connected between the steering post bearing 41 of the steering mechanism, and the rear tubular element 49 to complete the rigid structural frame 11 of the bicycle. Accordingly, this support frame structure 9 is sized generally to fit between the front and rear wheels of a standard-sized bicycle, and has a width generally compatible with normal operation of the pedals 56 by the rider.

As illustrated in the drawings, the support frame structure 9 is formed by interconnection of a plurality of generally U-shaped channel members 10, 12, 14, and 20. These channel members are formed from a relatively lightweight and inexpensive material such as sheet metal, and each has a central web section 13 bounded at its opposite longitudinal edges by a pair of side flanges 15 extending generally normal to the web section 13. In the preferred embodiment, these side flanges 15 are formed integrally with respect to their associated web section 13, although the side flanges 15 can be secured to the web section 13 as by bolting, welding, or the like, if desired.

Figure 3:
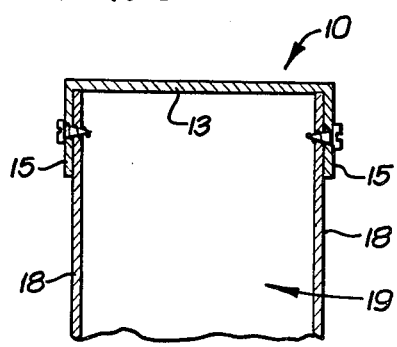
FIG. 3 is an enlarged fragmented sectional view taken generally along the line 3—3 of FIG. 1.

The U-shaped channel member 10 comprises an upper closure for the storage compartment 19 and extends generally horizontally between the rear tubular member 49 and the steering post bearing 41. More specifically, as viewed in FIG. 3, this upper channel member 10 is oriented with its side flanges 15 projecting downwardly and the front end of the channel member 10 is secured to a support plate 16 which is in turn secured to the steering post bearing 41.

Figure 2:
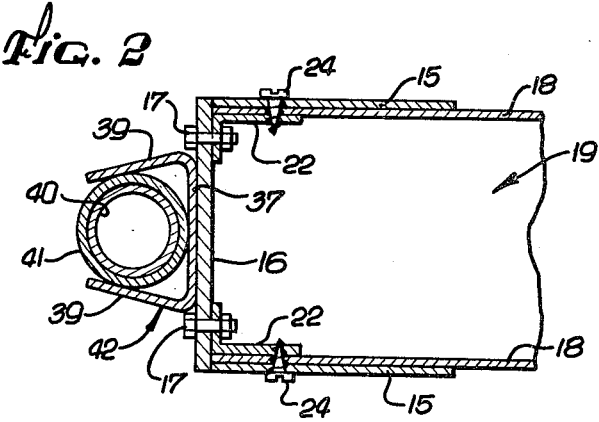
FIG. 2 is an enlarged fragmented sectional view taken generally along the line 2—2 of FIG. 1, illustrating connection of the support frame structure to a steering column of the bicycle.

As shown in FIG. 2, the support plate 16 is secured as by welding, for example, to a generally U-shaped and forwardly opening retainer 42 for receiving the steering post bearing 41. This retainer 42 includes a web section 37 secured to the support plate 16 and a pair of opposite legs 39 projecting angularly toward each other for engagement with the steering post bearing 41. As illustrated, this bearing 41 is rigidly secured within the retainer 42 by welds or the like to provide a rigid structural connection between the steering mechanism of the bicycle and the support frame structure 9 of this invention.

The support plate 16 is connected by bolts 17 or the like to a pair of L-shaped braces 22 for connection to the flanges 15 of the upper channel member 10. These L-shaped braces 22 are positioned along the opposite vertical margins of the support plate 16 each for connection of one of its legs to the support plate by the bolts 17 and for connection of its other leg to the channel member 10 flange 15. Screws 24 are provided, as shown, for connecting the flanges 15 to the braces 22, although other connecting means such as welds or the like can be used.

The support plate 16 is also connected near its lower end to the side flanges 15 of the channel member 14, which extends generally downwardly and rearwardly therefrom to form a front closure for the compartment 19. These side flanges 15 of this front channel member 14 are conveniently connected to the support plate 16 by means of additional screws 24 and bolts 17 secured to the lower ends of the L-shaped braces 22.

The front channel member 14 is oriented with its side flanges 15 facing generally rearwardly, and has its lower end shaped for connection to the front end of the channel member 20 which defines a lower closure for the compartment 19. More specifically, as viewed in FIG. 4, the side flanges 15 of the front channel member 14 terminate with a vertically extending edge for abutting engagement with the front edges of the side flanges 15 projecting upwardly from the lower channel member 20. Moreover, the central web section 13 of the front channel member 14 extends beyond the associated side flanges 15 and is turned generally horizontally for supportive engagement with the underside of the web section 13 of the lower channel member 20.

A tubular support member 68 extends angularly forwardly and upwardly from the pedal crank bearing housing 60 for connection to the support frame structure 9 to rigidly support the front and lower end of the structure 9. That is, the tubular support member 68 has its upper end secured to the end connected by welds 70 (FIGS. 4 and 5) to a horizontally disposed base plate 74. This base plate 74 is secured by bolts 72 to the overlapping web sections 13 of the front and lower channel members 14 and 20 to secure these channel members with respect to each other and with respect to the remaining components of the overall bicycle frame 11. Conveniently, for maximum rigidity, this front tubular support member 68 is oriented to extend generally in parallel with the angularly extending front channel member 14.

The remaining channel member 12 comprises a rear closure for the storage compartment 19, and has its lower and upper ends respectively connected to the rear ends of the lower channel member 20 and the upper channel member 10. Importantly, this rear channel member 12 is oriented to extend generally in parallel with the rear tubular member 49 with its side flanges 15 extending rearwardly toward the rear wheel 54. L-shaped braces 80 are secured by bolts 82 generally at the opposite vertical margins of the rear channel member 12, and these braces 80 each include a leg extending forwardly for connection by bolts 84 or the like to the rear ends of the lower and upper channel members 20 and 10, as viewed in FIG. 6.

The rear channel member 12 has, for example, a generally U-shaped retainer 51 similar to the bearing post retainer 42 (FIG. 2) secured to its central web section 13 as by welding. This retainer 51 in turn is secured by welds or the like about the upstanding rear tubular member 49 to secure the support frame structure 9 of this invention rigidly to rear components of the bicycle frame. Moreover, as illustrated in FIG. 6, the forward ends of the lower rear struts 52 are flattened for connection by appropriate welds to the side flanges 15 of the rear channel member 12, with the upper, rear struts 50 being similarly secured to these side flanges.

The side panels 18 are appropriately secured to the upper, front, lower, and rear members 10, 14, 20, and 12 to cooperate with those channel members in defining the storage compartment. More specifically, the side panels 18 are shaped generally to correspond with the outline defined by the interconnected channel members, and are secured by means of a plurality of the screws 24 to the side flanges of the upper, front, and lower channel members 10, 14, and 20. In addition, the side panels are secured with respect to the L-shaped braces 22 and 80 by the respective sets of bolts 17, 80, and 84. Alternately, if desired, all of the screws and bolts can be replaced by different fasteners, welds, or the like.

Figure 8:
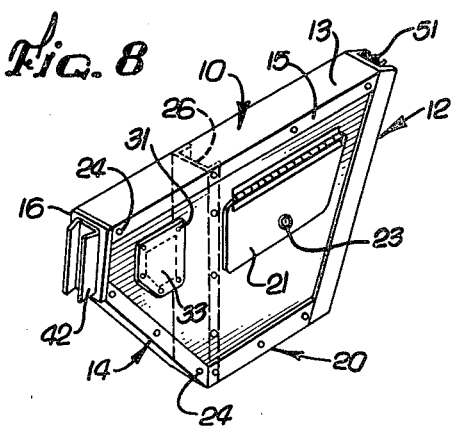
FIG. 8 is a perspective view of the support frame structure of this invention shown in assembled condition apart from remaining components of a bicycle.

As illustrated best in FIGS. 7 and 8, an internal brace member 26 is provided to extend between the upper and lower channel members 10 and 20. This internal brace member 26 is also conveniently generally channel-shaped in cross section, with central web section 27 sized to fit within the central web section of the upper and lower channel members 10 and 20. Side flanges 29 on the brace member 26 are suitably secured to the side flanges 15 of the upper and lower channel members and to the side panels by means of the screws 24 to secure the brace member in position for structurally rigidifying the entire support frame structure 9.

The internal brace member 26 conveniently divides the storage compartment 19 into front and rear sections. Access to these sections is respectively provided via access openings 32 in one or both of the side panels 18. As shown, these access openings 32 can be selectively closed by means of a door panel 33 held in place by screws 31, or by a hinged door 21 including a lock 23.

The support frame structure 9 of this invention thus provides a plurality of interconnected load-bearing elements which form a portion of the supporting frame 11 of the bicycle, and which cooperate with the side panels 18 to define the storage compartment 19. The structure 9 is relatively light in weight and is formed from inexpensive materials such as sheet metal or the like. The configuration of the support frame structure is such that baggage can be readily accommodated without an interference with normal operation of the bicycle.

Although a particular embodiment of the invention has been described in detail for purposes of illustration, various modifications may be made without departing from the spirit and scope of the invention. Accordingly, the invention is not to be limited, except as by the appended claims.

What is claimed is:

1. In a bicycle having a frame, front and rear wheels supported by the frame, and propulsion means, a support frame structure, comprising:
   load bearing means forming at least a portion of said bicycle frame for supporting structural loads, and for defining at least a portion of a storage compartment, said load bearing means comprising a plurality of channel members each having a generally U-shaped cross section and connected to said bicycle frame and to each other to enclose the top, front, bottom, and rear of the storage compartment;
   wall means for cooperating with said load bearing means for defining the storage compartment; and
   attachment means for securing said wall means to said load bearing means.

2. The support frame structure of claim 1 wherein said wall means has an access opening formed therein, and including means for selectively closing the access opening.

3. The support frame structure of claim 1 wherein each of said channel members includes a pair of side flanges extending generally perpendicularly from opposed margins of a central web section, and wherein said wall means comprises a pair of side panels connected respectively to said side flanges of a plurality of said channel members at opposite sides of said channel members to enclose opposite sides of the storage compartment.

4. The support frame structure of claim 3 further including at least one internal brace member within the storage compartment and connected between a pair of generally opposed ones of said channel members for dividing the storage compartment into a pair of storage compartment sections.

5. The support frame structure of claim 1 wherein the bicycle frame includes a steering mechanism in association with the front wheel, said support frame structure including means for securing said load bearing means with respect to the steering mechanism.

6. The support frame structure of claim 1 wherein the bicycle frame includes a rear frame element for supporting the rear wheel, said support frame structure including means for connecting said load bearing means with respect to the rear frame element.

7. In a bicycle having a frame, front and rear wheels supported by the frame, and propulsion means, a support frame structure, comprising:
   a plurality of channel members each having a generally U-shaped cross section and connected together to enclose the top, front, bottom, and rear of a storage compartment, said channel members being connected to the bicycle frame for providing structural load bearing elements for the frame;
   a pair of wall members respectively connected generally to the opposed side margins of channel members to enclose the opposite sides of the storage compartment, at least one of said wall members having an access opening formed therein.

8. The support frame structure of claim 7 including means for selectively closing the access opening.

9. The support frame structure of claim 7 wherein each of said channel members includes a central web section and a pair of side flanges, said wall members comprising a pair of side panels connected respectively to said side flanges of a plurality of said channel members at opposite sides of said channel members to enclose opposite sides of the storage compartment.

10. A bicycle, comprising:
    a front wheel;
    a steering mechanism supporting said front wheel;
    a rear wheel;
    propulsion means for driving said rear wheel;
    a rear frame section supporting said rear wheel and said propulsion means; and
    a support frame structure including load bearing means connected between said steering mechanism and said rear frame section, said load bearing means comprising a plurality of channel members each having a generally U-shaped cross section to include a central web section and a pair of side flanges and being adapted to support structural loads and to enclose the top, front, bottom, and rear of a storage compartment, and wall means connected to said load bearing means for enclosing opposite sides of the storage compartment.

11. The bicycle of claim 10 wherein at least one of said wall members has an access opening formed therein, and including means for selectively closing the access opening.

12. The bicycle of claim 10 wherein said plurality of channel members comprises upper, front, lower, and rear channel members connected together, and including first means for connecting said upper and front channel members to said steering mechanism, and second means for connecting said rear channel member to said rear frame section.

13. The bicycle of claim 12 wherein said propulsion means includes a pedal crank bearing housing carried at the lower end of said rear frame section, and further including a support member connected between said pedal crank bearing housing and said support frame structure.

14. The bicycle of claim 13 wherein said support member is connected to said support frame structure generally to said front and lower channel members.

15. The bicycle of claim 12 including an internal brace member connected between said upper and lower channel members to divide the storage compartment into a pair of storage compartment sections.

16. A bicycle, comprising:
a front wheel;
a steering mechanism supporting said front wheel;
a rear wheel;
propulsion means for driving said rear wheel;
a rear frame section supporting said rear wheel and said propulsion means;
a support frame structure including upper, front, lower, and rear generally U-shaped channel members connected together to enclose the top, front, bottom, and rear of a storage compartment, and a pair of side panels respectively connected to opposite sides of said channel members to enclose the sides of the storage compartment, said upper and front channel members being connected to said steering mechanism, and said rear channel member being connected to said rear frame section; and
a support member connected between said rear frame section and said lower channel member.

17. In a bicycle having a frame, front and rear wheels supported by the frame, and propulsion means, a support frame structure, comprising:
load bearing means forming at least a portion of said bicycle frame for supporting structural loads, and for defining at least a portion of a storage compartment, said load bearing means comprising at least one channel member having a generally U-shaped cross section to enclose at least one of the top, front, bottom, and rear of the storage compartment;
wall means for cooperating with said load bearing means for defining the storage compartment; and
attachment means for securing said wall means to said load bearing means.

18. A bicycle, comprising:
a front wheel;
a steering mechanism supporting said front wheel;
a rear wheel;
propulsion means for driving said rear wheel;
a rear frame section supporting said rear wheel and said propulsion means; and
a support frame structure including load bearing means connected between said steering mechanism and said rear frame section, said load bearing means being adapted to support structural loads and to form the top, front, bottom, and rear walls of a storage compartment, and means connected to said load bearing means for enclosing opposite sides of the storage compartment.

* * * * *